(12) United States Patent
Shen et al.

(10) Patent No.: US 8,889,200 B2
(45) Date of Patent: Nov. 18, 2014

(54) CHEWING GUM AND GUM BASES CONTAINING POLYOLEFIN THERMOPLASTIC ELASTOMER

(75) Inventors: Chungsea Shen, Deerfield, IL (US); Joo H. Song, Chicago, IL (US); Bruno Padovani, Chicago, IL (US); David W. Record, River Forest, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 521 days.

(21) Appl. No.: 12/209,564

(22) Filed: Sep. 12, 2008

(65) Prior Publication Data

US 2009/0017160 A1 Jan. 15, 2009

Related U.S. Application Data

(63) Continuation-in-part of application No. 12/046,189, filed on Mar. 11, 2008.

(60) Provisional application No. 60/894,396, filed on Mar. 12, 2007.

(51) Int. Cl.
- *A23G 4/08* (2006.01)
- *C08F 212/02* (2006.01)
- *C08K 5/01* (2006.01)
- *C08F 4/42* (2006.01)

(52) U.S. Cl.
CPC .................................. *A23G 4/08* (2013.01)
USPC .............. 426/6; 426/3; 526/348; 526/348.2; 526/348.3; 526/348.4; 526/348.6; 524/570

(58) Field of Classification Search
USPC ......... 426/3, 6; 526/348, 348.2, 348.3, 348.4, 526/348.6, 348.8; 524/570
See application file for complete search history.

(56) References Cited

U.S. PATENT DOCUMENTS

| | | | |
|---|---|---|---|
| 3,159,491 A | 12/1964 | Mahan | |
| 3,285,750 A | 11/1966 | Ishida | |
| 4,525,363 A * | 6/1985 | D'Amelia et al. | 426/3 |
| 4,590,075 A | 5/1986 | Wei et al. | |
| 4,842,870 A | 6/1989 | Dokuzovic et al. | |
| 5,116,627 A * | 5/1992 | Rutherford et al. | 426/5 |
| 5,286,500 A | 2/1994 | Synosky et al. | |
| 5,397,580 A | 3/1995 | Song et al. | |
| 5,419,919 A | 5/1995 | Song et al. | |
| 5,543,160 A | 8/1996 | Song et al. | |
| 5,651,936 A | 7/1997 | Reed et al. | |
| 5,712,341 A * | 1/1998 | Hofmann et al. | 524/528 |
| 5,969,070 A | 10/1999 | Waymouth et al. | |
| 6,086,925 A | 7/2000 | Song et al. | |
| 6,238,710 B1 | 5/2001 | Song et al. | |
| 6,583,228 B2 * | 6/2003 | Nkansah et al. | 525/242 |
| 7,531,594 B2 * | 5/2009 | Lin et al. | 524/487 |
| 2004/0234648 A1 | 11/2004 | Mazurek et al. | |
| 2005/0025858 A1 * | 2/2005 | Phillips et al. | 426/3 |
| 2006/0149109 A1 | 7/2006 | Ruziska et al. | |
| 2006/0280836 A1 * | 12/2006 | Jani et al. | 426/5 |
| 2008/0233234 A1 * | 9/2008 | Shen et al. | 426/6 |

FOREIGN PATENT DOCUMENTS

| | | |
|---|---|---|
| ES | 2190875 | 8/2003 |
| WO | 9309678 | 5/1993 |
| WO | 2007076425 A2 | 7/2007 |

OTHER PUBLICATIONS http://www.statemaster.com/encyclopedia/Polyisobutene (Retrieved Oct. 2010).*
http://pslc.ws/macrog/pib.htm (Retrieved Oct. 2010).*
International Search Report and Written Opinion regarding Application No. PCT/US2008/076206, dated Jan. 30, 2009.

* cited by examiner

*Primary Examiner* — Humera Sheikh
*Assistant Examiner* — Bhaskar Mukhopadhyay
(74) *Attorney, Agent, or Firm* — Armstrong Teasdale LLP

(57) ABSTRACT

A chewing gum contains a water-insoluble gum base portion containing a polyolefin thermoplastic elastomer; a water-soluble bulk portion; and at least one flavor component, which is cud-forming and chewable at mouth temperature.

23 Claims, No Drawings

CHEWING GUM AND GUM BASES CONTAINING POLYOLEFIN THERMOPLASTIC ELASTOMER

CROSS-REFERENCE TO RELATED APPLICATIONS

This application is a continuation-in-part to U.S. application Ser. No. 12/046,189, filed Mar. 11, 2008, which claims benefit to U.S. Provisional Application No. 60/894,396, filed Mar. 12, 2007, all incorporated by reference herein.

BACKGROUND OF THE INVENTION

The present invention relates to chewing gum. More specifically, this invention relates to improved formulations for chewing gum bases and chewing gum containing a polyolefin thermoplastic elastomer.

Primary components of a chewing gum typically are a water-insoluble gum base portion and a water-soluble bulking agent portion typically including a bulking agent (such as a sugar or sugar alcohol) together with minor amounts of secondary components such as flavors, colorants, water-soluble softeners, gum emulsifiers, acidulants and sensates. Typically, the water-soluble portion, sensates, and flavors dissipate during chewing and the gum base is retained in the mouth throughout the chew.

Water-insoluble gum base typically includes elastomers, elastomer plasticizers, softeners/emulsifiers including fats and oils, and fillers. Elastomers useful gum bases typically are synthetic elastomers such as polyisobutylene, isobutylene-isoprene copolymers ("butyl rubber"), styrene-butadiene copolymers, polyisoprene, and combinations thereof. Also, natural elastomers such as natural rubbers can be used.

Because the elastomer component of a gum base is a significant portion of a gum formulation, the characteristics of such elastomer are important to the gum composition, especially regarding those properties important to consumer acceptance. Among properties important to consumers are odor, taste, chewing properties, and mouthfeel, including an ability of a gum composition to form a cud while chewing. Further, physical characteristics of the elastomer affect processibility of a gum base and a chewing gum formulation including a gum base.

The elastomer most widely used in chewing gum is butyl rubber based on consumer acceptance of chewing properties for a resulting chewing gum product and a lack of objectionable odor or taste associated with butyl rubber. Polyisobutylene (PIB) is another elastomer frequently used in gum bases. Lower molecular weight (below 100,000 viscosity average) PIB improves compatibility of base components, modifies elasticity and softens the chewing characteristics of gum bases to which it is added. However, it is not generally usable as a sole elastomer replacement in a gum base formulation. Higher molecular weight (at least 100,000 viscosity average) PIB acts more like butyl rubber, but its use is less common. Styrene butadiene copolymer rubber (SBR) has been described as useful as an elastomer in gum products.

Typically, gum base components are blended in a mechanical mixer to form a uniform mixture which may be formed into sheets, blocks or pellets for later incorporation into a chewing gum. Proper mixing is important to maintain a uniform and consistent composition, which is capable of being further formed into consumer-acceptable products. Such mixing typically requires input of heat and mechanical energy over a sufficient time to manufacture a suitable product. Gum base formulations which require less energy or mixing time to produce a suitable product would be advantageous in the art.

Prior to blending in a mixer, it is typically necessary to grind elastomers such as natural rubbers, butyl rubber, SBR and higher molecular weight polyisobutylene into a course particulate. The grinding typically is carried out with addition of a filler, such as calcium carbonate or talc, to prevent agglomeration of the freshly ground elastomer. Often it is necessary to chill the elastomer before grinding or even to chill the grinding apparatus to enhance grinding efficiency and further reduce agglomeration. Even with these measures, it is usually necessary to carry out the grinding process within a few hours to a few days before the gum base mixing operation to prevent agglomeration of the ground elastomer. The entire grinding process is time and energy consuming and it reduces the flexibility of production scheduling. In a variation, it is possible to grind the elastomer in the mixer prior to commencement of the blending operation. However, this requires a more powerful mixer than would otherwise be necessary and it is generally inefficient and adds considerably to the total mixing time.

This invention is directed to a gum base and a consumer-acceptable chewing gum formulation containing such gum base which typically requires less mixing energy or time.

SUMMARY OF THE INVENTION

A chewing gum contains a water-insoluble gum base portion containing a thermoplastic polyolefin elastomer; a water-soluble bulk portion; and at least one flavor component, which is cud-forming and chewable at mouth temperature.

DESCRIPTION OF THE INVENTION

The present invention provides improved chewing gum formulations and chewing gum bases, as well as methods of producing chewing gum and chewing gum bases. In accordance with the present invention, chewing gum is provided that includes polyolefin thermoplastic elastomers as further described below (referred to as TPE's). TPE's are used in gum base formulations as an elastomer. In various preferred embodiments, TPE's may be added to gum base formulations as a replacement of a small or large quantity of other elastomers.

A variety of gum base and chewing gum formulations including TPE's can be created or used in accordance with the present invention. The base formulations of the present invention may be conventional bases that include wax or are wax-free, tacky or non-tacky and/or bubble gum-type bases. The gum formulations can be low or high moisture formulations containing low or high amounts of moisture-containing syrup. TPE's can be used in sugar-containing chewing gums and also in low sugar and non-sugar containing gum formulations made with sorbitol, mannitol, other polyols, and non-sugar carbohydrates. Non-sugar formulations can include low or high moisture sugar-free chewing gums.

In various preferred embodiments, a TPE useful in this invention may be used as the sole elastomer or may be is combined with other base elastomers for use in chewing gum base. Such other elastomers, where used, include synthetic elastomers including polyisobutylene, isobutylene-isoprene copolymers, styrene-butadiene copolymers, polyisoprene, and combinations thereof. Natural elastomers that can be used include natural rubbers such as chicle. In general, when a blend of elastomers is to be used, it is preferred to combine the TPE's of the present invention with lower or higher molecular weight polyisobutylene elastomer or with butyl rubber. A preferred gum base blend contains about 1 to 5 wt. % low molecular weight (e.g. 55,000 viscosity average MW) polyisobutylene. Such low molecular weight polyisobutylene cannot act as a sole elastomer replacement in a gum base, but it enhances the properties of other elastomers and has the advantage of being meltable.

In preferred embodiments of this invention, gum bases containing TPE's are more easily processed in a mixing apparatus, which typically results in less energy and less time needed to complete processing. This is due to thermoplasticity (as explained below) which allows such elastomers to be melted before addition to the mixer or within the mixer itself without a pre-grinding step. Furthermore, the TPE's of the present invention are more quickly and easily blended with other gum base ingredients to produce a homogeneous mixture. Additionally, when in the molten form, the TPE's exhibit less viscosity than conventional elastomers thus reducing mixer load and corresponding power consumption. By substituting the TPE's of the present invention for conventional gum base elastomers significant cost savings can be realized through reduced time and labor, reduce energy consumption and reduced capital expenditure.

TPE, useful in accordance with the present invention, affords the chewing gum excellent texture, shelf life and flavor quality. Because these TPE's have chewing properties similar to other elastomers in most respects, gum bases comprising TPE's create a resultant chewing gum product that has a high consumer-acceptability.

The present invention provides in some embodiments an improved chewing gum formulation, improved shelf life, and improved flavor quality. Additional features and advantages of the present invention are described in, and will be apparent from, the detailed description of the presently preferred embodiments.

Polyolefin thermoplastic elastomers (TPE's) are a family of elastomeric polymers within a larger group of olefin polymers which, in their final state, are (1) thermoplastic in the sense of being melt processable as a melt at elevated temperatures and harden when cooled, i.e. capable of being repeatedly softened and melted by an increase of temperature and hardened by a decrease of temperature: (2) elastomeric in the sense of having an ability to be stretched to at least twice of an original length and to return to substantially equal original length (such as at least 50%, preferably at least 75% or 80%) upon release of stress; and (3) absence of significant creep in the sense of not being permanently deformed upon application of a stress (such as a long term applied stress which is below the yield strength or ultimate strength of the material).

Polyolefins useful in this invention are polymerized olefins that are aliphatic unsaturated hydrocarbons. Preferably, TPE's useful in this invention are copolymers of such olefins. The most typical monomers used in such polyolefins are ethylene and alpha-olefins containing up to ten (preferably up to eight) carbon atoms. Principal olefin monomers include ethylene, propylene, butene-1,4-methylpentene, hexene, octene and combinations thereof. Polyolefins include ethylene polymers, propylene polymers, and combinations thereof including combinations with $C_4$-$C_{10}$ alpha-olefins. A preferable TPE is a copolymer of propylene and ethylene. Other preferable TPE's include elastomeric ethylene-octene and ethylene-butene copolymers. Suitable TPE's useful in this invention are available from Dow Chemical Co. of Midland, Mich. under the tradename ENGAGE™. Another particularly preferred TPE are sold under the trade name Vistamaxx™ by Exxon Mobil Chemical of Houston, Tex. Elastomeric polyolefins typically contain ethylene and propylene, and may contain $C_4$-$C_{10}$ olefin (preferably alpha-olefin) monomer units. Some particularly preferred TPE's are copolymers of ethylene with at least one other olefin monomer, such as ethylene-propylene copolymers and ethylene-octene copolymers.

Polyolefin thermoplastic elastomers useful in this invention are distinguished from other polyolefins such as polyisobutylene and ethylene-propylene rubber as known in the art. Polyisobutylene as that term is used herein is a homopolymer of isobutylene in contrast to butyl rubber, which is a copolymer of isobutylene with a small amount of isoprene to form a crosslinkable polymer rubber. (The term "polyisobutylene" sometimes is used in the art as including a polymer containing both isobutylene and isoprene monomer units.) Polyisobutylene will have significant creep and is not considered a thermoplastic elastomer as used herein. Similarly, ethylene propylene (EP) rubber (a random copolymer of ethylene and propylene) typically will experience creep and lack elastomeric characteristics as required by thermoplastic elastomers. In typical commercial practice, small amounts of butadiene are incorporated with ethylene and propylene to form a crosslinkable ethylene-propylene-diene monomer (EPDM) rubber. Further, polyolefin thermoplastic elastomers useful in this invention typically are not crosslinked or vulcanized to an extent which materially affects the thermoplastic character of the material.

TPE's may be used to develop new types of chewing gum products and generally exhibit one or more beneficial attributes including, for example, high elasticity, softness, toughness, flexibility, and/or cohesion. TPE's may be prepared using metallocene-based catalyst systems to create polymers with increased elasticity, greater strength, greater cohesion, flexibility and/or toughness. TPE's may be tailored for specific attributes in different applications in multiple ways and as specialty elastomers can be used as replacements or partial replacements of synthetic rubber elastomers in chewing gum base. TPE's also may be blended in various combinations to replace or partially replace natural elastomers such as chicle, Sorva, and Jelutong, or may replace or partially replace synthetic rubber elastomers in chewing gum base. Typical synthetic rubber elastomers used in blended chewing gum bases are styrene butadiene rubber (SBR), isobutylene-isoprene copolymers (butyl rubber), and polyisobutylene (PIB).

TPE's are available in a variety of grades for various types of applications. Various grades are used in plastic films with polypropylene (PP) or other types of thermoplastic olefin (TPO). These types of films are U.S. Food and Drug Administration (FDA) approved for use in contact with food, but are not currently food approved by the FDA for use in chewing gum. The various types of polyolefin materials developed for contact with food may be combined with other types of polyolefins or other types of natural or synthetic rubber elastomers to make chewing gum bases.

The olefin monomers useful in preparing the TPE's of the present invention are most commonly sourced from a petroleum feedstock. However, it is also possible to derive these olefins from biomass or vegetative sources by fermenting the vegetative source to produce a lower alcohol, then converting the alcohol to an olefin. Such a conversion is disclosed in US 20060149109, which is incorporated herein by reference.

TPE's can be used in a variety of different chewing gum base formulations. Typically, one or more TPE's constitute from about 1% to about 40% by weight of the chewing gum base, more typically from about 5% to about 30% by weight of the chewing gum base (e.g., preferably from about 5% to about 20% by weight of the gum base). As a result, TPE's typically constitute from about 0.1% to about 15% by weight of chewing gum formulations, or from about 0.2% to about 10% by weight of chewing gum formulations. TPE's may be blended with other suitable natural or synthetic elastomers as a component in a gum base.

TPE's can be used in a variety of different chewing gum base formulations. Gum bases may contain natural or synthetic elastomers, may contain wax or may be wax-free. TPE's may be used in conventional gum base formulations, in bubble gum formulations, or non-tack gum base formulations. Gum formulations of the present invention may be used for stick gums, tab gums, coated pellet gums, center filled gums, or may be sugar or sugar-free chewing gums A water-insoluble gum base generally contains elastomers, elastomer plasticizers including resins and plastic resins, softeners/emulsifiers, compatiblizers and inorganic fillers. A water-insoluble gum base may constitute from about 5 to about 95% by weight of the chewing gum, typically constitute from about 10 to about 50% by weight of the chewing gum and, in various preferred embodiments, constitute from about 20 to about 35% or 5 to 30% by weight of the chewing gum.

In various embodiments, a chewing gum base of the present invention typically contains at least 5 wt. %, more typically at least 10 wt. %, and preferably at least 20 wt. % elastomer. Also typically such a gum base contains up to 70 wt. % elastomer, more typically up to 60 wt. %, and preferably up to 50 wt. % elastomer. In an embodiment, the gum base of the present invention contains between 5 and 60% elastomer.

A typical gum base of this invention typically includes at least 5 wt. % and more typically at least 10 wt. % elastomer plasticizer and typically includes up to 35 wt. % and more typically up to 30 wt. % elastomer plasticizer. Further, a typical gum base includes at least 5 wt. % and more typically at least 10 wt. % softener and includes up to 35 wt. % and more typically up to 30 wt. % softener. Still further, a typical gum base includes at least 5 wt. % and more typically at least 15 wt. % hydrophilic modifier and includes up to 40 wt. % and more typically up to 30 wt. % of a hydrophilic modifier such as polyvinylacetate. Minor amounts (e.g., up to about 1 wt. %) of miscellaneous ingredients such as colorants, antioxidants, and the like also may be included into such a gum base.

A typical gum base useful in this invention includes about 7 to 60 wt. % synthetic elastomer, 0 to 30 wt. % natural elastomer, about 5 to about 55% by weight elastomer plasticizer, about 4 to about 35 wt. % filler, about 5 to about 35 wt. % softener, and optional minor amounts (e.g., about 1 wt. % or less) of miscellaneous ingredients such as colorants, antioxidants, and the like.

In an embodiment, a chewing gum base of the present invention contains about 10 to about 50 weight percent synthetic elastomer, 0 to about 30 weight percent natural elastomer, about 5 to about 55 weight percent elastomer plasticizer, about 4 to about 35 weight percent filler, about 5 to about 35 weight percent softener, about 5 to about 40% hydrophilic modifier and optional minor amounts (about one percent or less) of miscellaneous ingredients such as colorants, antioxidants, and the like.

Additional synthetic elastomers may include, but are not limited to, polyisobutylene with a viscosity average molecular weight of about 100,000 to about 800,000, isobutylene-isoprene copolymer (butyl elastomer), styrene-butadiene copolymers having styrene-butadiene ratios of about 1:3 to about 3:1 and/or polyisoprene content of about 5 to about 50 percent by weight of the gum base, and combinations thereof.

The elastomer component of gum bases used in this invention may contain up to 100 wt. % TPE's. Alternatively, mixtures of TPE's with other elastomers also may be used, including elastomeric components of gum bases containing at least 10 wt. % TPE, typically at least 30 wt. % and preferably at least 50 wt. % of the elastomeric component. A typical elastomeric component contains between 50 to 100 wt. % TPE and preferably 75 to 100 wt. % TPE. A gum base with a elastomer component containing 75 to 90 wt. % or 90 to 100 wt. % TPE also is useful.

TPE's typically are low modulus, flexible polymeric materials, which can be stretched to at least twice their original length at ambient temperature with an ability to return to substantially their original length after a stretching stress has been released. When formulated into a gum base, such gum base will partially recover (typically up to about 50% or more) after deformation during chewing. Typical elastomers useful in this invention have an elongation to break in excess of 150% and preferably in excess of 200%. A suitable TPE useful in this invention is non-tacky at ambient conditions.

A typical gum base containing TPE's made according to the present invention has a modulus (a measure of force to stretch) of 100 to 600 kPa at 40° C. (measured on a Rheometric Dynamic Analyzer with dynamic temperature steps, 0-100° C. at 3° C./min; parallel plate; 0.5% strain; 10 rad/s). A preferred TPE-containing gum base made according to the present invention has a modulus of 200 to 500 kPa and still more preferably between 300 to 400 kPa.

Further, such elastomers are thermoplastic in the sense that they are processable as a melt at elevated temperatures and harden when cooled. After cooling, a thermoplastic polymer may be further melt processable in contrast to a thermoset, crosslinked, or vulcanized polymer. In addition such polymers have an absence of significant creep. Creep is a tendency of a solid material to slowly move or deform permanently under the influence of stresses, and occurs as a result of long term exposure to levels of stress that are below the yield strength or ultimate strength of the material. Usually, creep is more severe in materials which are subjected to heat for long periods, and near the melting point and increases with temperature.

A TPE suitable for use in a chewing gum base should be sufficiently pliable at typical mouth temperatures (e.g., 35-40° C.) to give good mouthfeel. Typically, such TPE is capable of being softened through incorporation of plasticizer or softener materials to provide a gum base composition having consumer-acceptable mouthfeel.

A suitable TPE used in this invention typically should be essentially without taste and have an ability to incorporate flavor materials which provide a consumer-acceptable flavor sensation. Further, preferably, such TPE is nontoxic and food acceptable and therefore capable of being food approved by government regulatory agencies.

Typically, a TPE has sufficient cohesion such that a chewing gum composition containing such material retains cohesion during the chewing process and forms a discrete gum cud. An embodiment of a TPE useful in this invention includes a TPE having partial polymeric crystallinity to maintain acceptable cohesion during a chewing process. Polymeric crystallinity may be confirmed through x-ray diffraction spectrometry or observation of a polymeric crystalline melting point phase change in a differential scanning calorimeter (DSC) thermogram. An ethylene-propylene TPE preferably shows polypropylene crystallinity.

Typical properties of suitable TPE's useful in this invention include having a specific gravity between 0.855 and 0.90, preferably 0.860 to 0.870; melt flow rate (MFR, D1238, 2.16 kg, 230° C.) of 1 to 30 g/10 min, preferably 2 to 25 g/10 min.; a glass transition temperature ($T_g$) of −10 to −65° C., preferably −20 to −55° C.; a crystalline melting point ($T_m$ by DSC) of 40 to 160° C., preferably 50 to 150° C.; an ultimate elongation of 100 to 1500%, preferably 200 to 1000%; an elastic recovery of 75 to 98%, preferably 80 to 97%; a tensile strength of 2 to 35 MPa, preferably 5 to 30 MPa; a Mooney viscosity of 4 to 35, preferably 5 to 30; and a Shore hardness A of 40 to 100, preferably 50 to 90. A characteristic of a TPE made using a metallocene catalyst system is a relative narrow polydispersity (molecular weight distribution measured as $M_w/M_n$) typically between 1.5 and 2.5, preferably 1.8 to 2.2, and usually around 2.

Typical TPE's useful in this invention are polymers of ethylene with co-monomers of propylene, butene, hexene, or octene or mixtures thereof. Copolymers of ethylene with propylene or octene are preferred. Co-monomer content typically is above about 10 wt. % and may range up to 90 wt. %. Preferred co-monomer contents are between 10 and 20 wt. % for propylene/ethylene and typically 35 to 55 wt. % for ethylene/octene or ethylene/hexene. The amount of co-monomer used usually depends on the properties desired.

In one embodiment a TPE, typically comprising a propylene/ethylene copolymer (such as sold under the Vistamaxx™ tradename), useful in this invention has the following physical characteristics:

| | |
|---|---|
| Specific Gravity | 0.86-0.89 |
| Melt Flow Rate (ASTM D1238, 230° C.) | 1-25 g/10 min. |
| Mooney Viscosity ML | 5-30 |
| Molecular Weight | 150,000-250,000 |
| Polydispersity ($M_w/M_n$) | 1.8-2.2 (preferably ca. 2) |
| $T_g$ | −10--30° C. |
| $T_m$ | 40-160° C. |
| Shore Hardness A | 50-90 |
| Tensile Strength | 15-28 MPa |
| Elongation | 100-1000% |
| Elastic Recovery | 80-97% |

Particularly advantageous ethylene/propylene copolymers have densities of 0.862 and 0.861 g/cm³, MFR's of 22 and 18 g/10 min., and co-monomer contents of 14 and 15 wt. %, each with high elasticity, (such as sold under the Vistamaxx™ 1120 and 6202 tradenames).

In another embodiment a TPE, typically comprising a ethylene/octene copolymer with an octene content of around 42 wt. %, such as that sold under the Engage 8130™ tradename, useful in this invention has the following approximate physical characteristics:

| | |
|---|---|
| Density | 0.864 g/cm³ |
| Melt Flow Rate (ASTM D1238, 190° C.) | 13 g/10 min. |
| Mooney Viscosity ML @121° C. (ASTM D1646) | 4 |
| $T_g$ | −55° C. |
| $T_m$ | 56° C. |
| Shore Hardness A (ASTM D2240) | 63 |
| Shore Hardness D (ASTM D2240) | 13 |
| Flexural Modulus (ASTM D790) | |
| 1% Secant | 7.8 MPa |
| 2% Secant | 7.3 MPa |
| Tear Strength (ASTM D624) | 26.4 kN/m |
| Tensile Strength | 2.4 MPa |
| Ultimate Elongation (ASTM D638, 508 mm/min) | 800% |

An example of a propylene-based stereoblock thermoplastic elastomer is described in U.S. Pat. No. 5,969,070.

Gum bases and chewing gum formulations of this invention may contain elastomer components comprising a combination of TPE's with other elastomers.

Preferred characteristics of suitable synthetic elastomers include, for polyisobutylene, a viscosity average molecular weight of from about 100,000 to about 800,000, for styrene-butadiene, 1:1 to 1:3 bound styrene:butadiene ratio. A viscosity average molecular weight is calculated in accordance with techniques known in the art using a measurement of a polymer viscosity. Typically, a viscosity average molecular weight is closer to a weight average molecular weight than to a number average molecular weight as measured by gel permeation chromatography (GPC).

Natural elastomers useful for inclusion into chewing gum of this invention include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is non-adhesive or conventional, bubble gum or regular gum, as discussed below. Preferred natural elastomers include jelutong, chicle, sorva and massaranduba balata.

A water-insoluble gum base typically constitutes approximately 5 to about 95 percent, by weight, of a chewing gum of this invention; more commonly, the gum base comprises 10 to about 50 percent of a chewing gum of this invention; and in some preferred embodiments, 20 to about 35 percent, by weight, of such a chewing gum.

A gum base useful in this invention also may include elastomer plasticizers (also called elastomer solvents), such as terpene resins and natural rosin esters, as well as other elastomer plasticizers.

Suitable elastomer plasticizers useful in this invention include, but are not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing. The preferred elastomer plasticizers also will vary depending on the specific application, and on the type of elastomer which is used.

In addition to natural rosin esters, also called resins, elastomer plasticizers may include other types of plastic resins. These include polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof. Preferred weight average molecular weights (by GPC) for polyisoprene are 50,000 to 80,000 and for polyvinyl acetate are 10,000 to 65,000 (with higher molecular weight polyvinyl acetates typically used in bubble gum base). For vinyl acetate-vinyl laurate, vinyl laurate content of 10-45 percent by weight of the copolymer is preferred. Preferably, a gum base contains a plastic resin in addition to other materials functioning as elastomer plasticizers.

Additionally, a gum base may include fillers/texturizers and softeners/emulsifiers. Softeners (including emulsifiers) are added to chewing gum in order to optimize the chewability and mouth feel of the gum.

Softeners/emulsifiers that typically are used include tallow, hydrogenated tallow, hydrogenated and partially hydrogenated vegetable oils, cocoa butter, mono- and di-glycerides such as glycerol monostearate, glycerol triacetate, lecithin, paraffin wax, microcrystalline wax, natural waxes and combinations thereof. Lecithin and mono- and di-glycerides also function as emulsifiers to improve compatibility of the various gum base components.

Fillers/texturizers typically are inorganic, water-insoluble powders such as magnesium and calcium carbonate, ground limestone, silicate types such as magnesium and aluminum silicate, clay, alumina, talc, titanium oxide, mono-, di- and tri-calcium phosphate and calcium sulfate. Insoluble organic fillers including cellulose polymers such as wood as well as combinations of any of these also may be used.

Selection of various components in chewing gum bases or chewing gum formulations of this invention typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, may be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

As noted, the base may include wax or be wax-free. An example of a wax-free gum base is disclosed in U.S. Pat. No. 5,286,500, the disclosure of which is incorporated herein by reference.

In addition to a water-insoluble gum base portion, a typical chewing gum composition includes a water-soluble bulk portion (or bulking agent) and one or more flavoring agents. The water-soluble portion can include high intensity sweeteners, binders, flavoring agents, water-soluble softeners, gum emulsifiers, colorants, acidulants, fillers, antioxidants, and other components that provide desired attributes.

Water-soluble softeners, which may also known as water-soluble plasticizers and plasticizing agents, generally constitute between approximately 0.5 to about 15% by weight of the chewing gum. Water-soluble softeners may include glycerin, lecithin, and combinations thereof. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener will be useful in chewing gums of this invention to provide sweetness, bulk and texture to the product. Typical bulking agents include sugars, sugar alcohols, and combinations thereof. Bulking agents typically constitute from about 5 to about 95% by weight of the chewing gum, more typically from about 20 to about 80% by weight and, still more typically, from about 30 to about 70% by weight of the gum. Sugar bulking agents generally include saccharide containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder/softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and US 2004-234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed.

High intensity artificial sweeteners can also be used in combination with the above-described sweeteners. Preferred sweeteners include, but are not limited to sucralose, aspartame, salts of acesulfame, alitame, neotame, saccharin and its salts, cyclamic acid and its salts, glycyrrhizin, stevia, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8% by weight. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

The present invention may be used with a variety of processes for manufacturing chewing gum.

Chewing gum base typically is made by conventional batch mixing or continuous mixing processes. Process temperatures generally are from about 120° C. to about 180° C. in the case of a batch process. In a typical batch process, one or more elastomers are first ground or shredded along with filler followed by transferring ground or shredded elastomer to a batch mixer for compounding. Standard, commercially available mixers known in the art (e.g., a Sigma blade mixer) may be used for this purpose. During compounding, ground elastomer typically is combined with filler and elastomer plasticizer (elastomer solvent). This compounding step generally requires long mixing times (30 to 70 minutes) to produce a homogeneous mixture. Usually after compounding, additional filler and elastomer plasticizer are added followed by PVAc and finally softeners while mixing to homogeneity after each added ingredient. Minor ingredients such as antioxidants and color may be added at any time in the process. The TPE's of the present invention need not be pre-ground and the compounding step proceeds much more quickly than with conventional elastomers, normally being completed in about three to ten minutes. The completed base is then extruded or cast into any desirable shape (e.g., pellets, sheets or slabs) and allowed to cool and solidify. The total process time (not including the pre-grind step) is typically about 90 to 180 minutes for conventional elastomers versus about 40 to 70 minutes for a TPE base.

Alternatively, continuous processes using mixing extruders, which are generally known in the art, may be used to prepare the gum base. In a typical continuous mixing process, initial ingredients (including ground elastomer) are metered continuously into extruder ports various points along the length of the extruder corresponding to the batch processing sequence. After the initial ingredients have massed homogeneously and have been sufficiently compounded, the balance of the base ingredients are metered into ports or injected at various points along the length of the extruder. Typically, any remainder of elastomer component or other components are added after the initial compounding stage. The composition is then further processed to produce a homogeneous mass before discharging from the extruder outlet. Typically, the transit time through the extruder will be substantially less than an hour. Employing the TPE's of the present invention will reduce the necessary length of the extruder needed to produce a homogeneous gum base with a corresponding reduction in transit time. In addition, the TPE need not be pre-ground before addition to the extruder. It is only necessary to ensure that the elastomer is provided in pelletized or other form which will allow controlled, metered feeding into the extruder inlet port.

Exemplary methods of extrusion, which optionally may be used in accordance with the present invention, include the following, the entire contents of each incorporated herein by reference: (i) U.S. Pat. No. 6,238,710, describes a method for continuous chewing gum base manufacturing, which entails compounding all ingredients in a single extruder; (ii) U.S. Pat. No. 6,086,925 discloses the manufacture of chewing gum base by adding a hard elastomer, a filler and a lubricating agent to a continuous mixer; (iii) U.S. Pat. No. 5,419,919 discloses continuous gum base manufacture using a paddle mixer by selectively feeding different ingredients at different locations on the mixer; and, (iv) U.S. Pat. No. 5,397,580 discloses continuous gum base manufacture wherein two continuous mixers are arranged in series and the blend from the first continuous mixer is continuously added to the second extruder.

If a blend of TPE and a conventional elastomer is desired, it may be advantageous to prepare separate gum bases, each containing either the TPE elastomer (or a blend of TPE elastomers) or the conventional elastomer (or a blend of conventional elastomers.) The separate gum bases can then be blended together in any desired ratio. This blending process may be carried out in a separate mixer or kettle or it may be carried out in the gum mixer prior to addition of other gum ingredients. By preparing separate bases and then blending them together, the processing efficiency improvement provided by use of TPE is maximized.

Chewing gum generally is manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first melting the gum base and adding it to the running mixer. The gum base may alternatively be melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion.

A general process for mixing gum base is outlined below:

| Mixing step | Ingredients added | Mixing step description | Mixing time (typical for conventional elastomers) |
|---|---|---|---|
| 1 | Elastomer compounding - blends all elastomer(s) and at least a portion of fillers and elastomer plasticizer | Rubber, in solid ground particles (5-10 mm in length), is smeared and mixed homogeneously with fillers, and resins to form a dough-like mixture. This stage of mixing requires a specific ratio* of rubber to resins and fillers. Too much elastomer plasticizer causes over-lubrication in which rubber particles slip through the mixer blades, and are not smeared. Fillers are used to fill-in the mixing volume required for effective smearing, and reduce the lubrication effect. Mixing is complete when a smooth, lump-free, homogeneous liquid is achieved. | 30-60 minutes |

| Mixing step | Ingredients added | Mixing step description | Mixing time (typical for conventional elastomers) |
|---|---|---|---|
| 2 | Complete addition of fillers and elastomer plasticizer. May add PVAc to increase volume. | In this stage, the rest of the fillers and elastomer plasticizer are added according to the base formula. The fillers and elastomer plasticizers are dispersed homogeneously in the compounded rubber mixture. A small amount of PVAc may be added to increase the mixing volume, but care must be used not to add too much which would cause over-lubrication. This mixing stage is complete when the product is a homogeneous dough-like mixture containing no visible particles | 20-30 minutes |
| 3 | Mixing PVAc, wax | At this stage, additional ingredients are added in order of decreasing viscosity or melting point, starting with high molecular weight PVAc, low molecular weight PVAc and waxes. Ingredients such as PVAc may be divided into 2-3 addition steps if a high quantity (more than 10%) is used in the formula. Mixing is continued until the mixture is homogeneous. | 20-30 minutes |
| 4 | Mixing fats/oil, emulsifiers. | Fats/oils and emulsifiers have low viscosity and melting point. This stage of mixing turns solid-like mixture into liquid-like. Mixing is complete when the product is homogeneous and no phase separation (liquid oil floating on top) is present. | 20-30 minutes |

Note:
Powder color ingredients and antioxidants used in small amounts (less than 1%) can be added at any point in the mixing process.
*Approximately 5 parts elastomer to 1 part elastomer plasticizer plus filler as needed to adjust volume and lubrication, typically about 1.5 parts.

The above mixing times are for factory scale processing. Lab scale processing is somewhat faster. As previously explained, typically it is necessary to pre-grind the conventional elastomers in a process which takes approximately five minutes.

In yet another alternative, it is possible to prepare the gum base and chewing gum in a single high-efficiency extruder as disclosed in U.S. Pat. No. 5,543,160. Chewing gums of the present invention may be prepared by a continuous process comprising the steps of: a) adding gum base ingredients into a high efficiency continuous mixer; b) mixing the ingredients to produce a homogeneous gum base, c) adding at least one sweetener and at least one flavor into the continuous mixer, and mixing the sweetener and flavor with the remaining ingredients to form a chewing gum product; and d) discharging the mixed chewing gum mass from the single high efficiency continuous mixer.

Of course, many variations on the basic gum base and chewing gum mixing processes are possible.

EXAMPLES

The following examples of the invention and comparative run illustrate, but do not limit the invention described and claimed. Amounts listed are in weight percent.

Gum bases shown in Table 1 and 2 were prepared in a conventional manner using Engage™ and Vistamaxx™ TPE's as indicated.

TABLE 1

| | EXAMPLE | | | | |
|---|---|---|---|---|---|
| | 1 | 2 | 3 | 4 | 5 |
| Vistamaxx 1100 ™ | 10.48 | — | — | — | 8.84 |
| Vistamaxx 6100 ™ | — | 8.84 | — | — | — |
| Vistamax 1120 ™ | — | — | 8.84 | — | — |
| Vistamax 6200 ™ | — | — | — | 8.84 | — |
| Polyisobutylene Elastomer | — | 1.64 | 1.64 | 1.64 | 1.64 |
| Terpene Resin | 22.69 | 22.69 | 22.69 | 22.69 | 22.69 |
| Calcium Carbonate | 21.02 | 21.02 | 21.02 | 21.02 | 21.02 |
| Polyvinyl Acetate | 24.40 | 24.40 | 24.40 | 24.40 | 24.40 |
| Hydrogenated Palm Oil | 13.81 | 13.81 | 13.81 | 13.81 | 13.81 |
| Mono- and Di-Glycerides | 4.25 | 4.25 | 4.25 | 4.25 | 4.25 |
| Lecithin | 3.29 | 3.29 | 3.29 | 3.29 | 3.29 |
| BHT | 0.06 | 0.06 | 0.06 | 0.06 | 0.06 |

TABLE 2

| | EXAMPLE | |
|---|---|---|
| | 6 | 7 |
| Engage 8130 ™ | 9.98 | 10.78 |
| Calcium Carbonate | 10.97 | 3.77 |
| Terpene Resin | 29.42 | 31.81 |
| Polyvinyl Acetate | 21.95 | 23.72 |
| Mono- and Di-Glycerides | 5.19 | 5.61 |
| Hydrogenated Palm Oil | 11.97 | 12.94 |
| Hydrogenated Vegetable Oil | 10.47 | 11.32 |
| BHT | 0.05 | 0.05 |

Chewing gum compositions were produced using gum bases described in Tables 1 and 2 and are shown in Tables 3 and 4.

TABLE 3

|  | EXAMPLE | |
| --- | --- | --- |
|  | 8 | 9 |
| Gum base of Ex. 3 | 30.00 | — |
| Gum base of Ex. 4 | — | 30.00 |
| Sorbitol | 52.57 | 52.57 |
| Xylitol | 1.00 | 1.00 |
| Talc | 6.00 | 6.00 |
| Glycerin | 5.00 | 5.00 |
| Melon Flavor | 2.40 | 2.40 |
| Citric Acid | 2.00 | 2.00 |
| Encapsulated High Intensity Sweeteners | 0.83 | 0.83 |
| Cooling Agent | 0.20 | 0.20 |

TABLE 4

|  | EXAMPLE | |
| --- | --- | --- |
|  | 10 | 11 |
| Gum base of Ex. 6 | 20.00 | — |
| Gum base of Ex. 7 | — | 20.00 |
| Sugar | 60.30 | 60.15 |
| Corn Syrup | 17.00 | 17.00 |
| Peppermint Flavor | 1.50 | 1.65 |
| Lecithin | 0.20 | 0.20 |
| Glycerin | 1.00 | 1.00 |

The chewing gums of Tables 3 and 4 were prepared in a conventional manner and evaluated in an informal sensory test. The gums were found to be comparable to commercial chewing gums of the prior art.

To demonstrate processing advantages in producing gum bases according to the present invention, gum bases were mixed according to the formulations listed in Table 5.

TABLE 5

|  | Example 12 Inventive | Comparative Run A | Comparative Run B | Comparative Run C |
| --- | --- | --- | --- | --- |
| Ethylene/octene copolymer TPE - Dow Chemical ENGAGE ™ 8130 (Pelletized) | 10.782 | 0 | 0 | 0 |
| Butyl Rubber - Lanxess ™ 101-3 (Ground) | 0 | 10.782 | 0 | 0 |
| Polyisobutylene BASF Oppanol ™ 50 SF - 400,000 viscosity average MW (Ground) | 0 | 0 | 10.782 | 0 |
| Styrene/Butadiene Rubber (50:50 blend of 48:52 and 24:76 styrene:butadiene copolymer) (Ground) | 0 | 0 | 0 | 10.782 |
| Calcium Carbonate | 3.774 | 3.774 | 3.774 | 3.774 |
| Terpene Resin | 31.806 | 31.806 | 31.806 | 31.806 |
| PVAc (low MW) | 23.721 | 23.721 | 23.721 | 23.721 |
| Mono- and Di-glycerides | 5.607 | 5.607 | 5.607 | 5.607 |
| Hydrogenated Vegetable Oil | 24.260 | 24.260 | 24.260 | 24.260 |
| BHT | 0.050 | 0.050 | 0.050 | 0.050 |
| Total | 100.000 | 100.000 | 100.000 | 100.000 |

The formulations from Table 5 were mixed in laboratory scale equipment in accordance with a general process procedure identified above. The mixing times required to produce homogeneous gum bases are summarized in Table 6.

TABLE 6

| Example/Run | Elastomer | Mix Time (minutes) | Total time including elastomer grinding |
| --- | --- | --- | --- |
| 12 | TPE (Inventive) | 48 | 48 |
| A | Butyl Rubber (Comparative) | 90 | 95 |
| B | PIB (Comparative) | 90 | 95 |
| C | SBR (Comparative) | 95 | 100 |

Example 13 and Comparative Runs D-F

Chewing gums were made from the gum bases of Example 12 and Runs A, B, and C according to the formulations in Table 7.

TABLE 7

|  | Example 13 | Run D | Run E | Run F |
| --- | --- | --- | --- | --- |
| Gum Base of Ex. 12 (Inventive) | 20.00 | — | — | — |
| Gum Base of Run A (Comparative) | — | 20.00 | — | — |
| Gum Base of Run B (Comparative) | — | — | 20.00 | — |
| Gum Base of Run C (Comparative) | — | — | — | 20.00 |
| Sugar | 60.15 | 60.15 | 60.15 | 60.15 |
| Corn Syrup | 17.00 | 17.00 | 17.00 | 17.00 |
| Glycerin | 1.51 | 1.51 | 1.51 | 1.51 |
| Flavor | 1.05 | 1.05 | 1.05 | 1.05 |
| Lecithin | 0.20 | 0.20 | 0.20 | 0.20 |
| Natural Color | 0.09 | 0.09 | 0.09 | 0.09 |
| Total | 100.00 | 100.00 | 100.00 | 100.00 |

The chewing gums of Example 13 and Runs D, E, and F were chewed by experienced panelists and found to have acceptable flavor and texture and to form a chewable cud at mouth temperature.

Changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A chewing gum base comprising a polyolefin thermoplastic elastomer, which is cud-forming and chewable at mouth temperature, wherein the polyolefin thermoplastic is selected from the group consisting of:
   (i) a copolymer of ethylene and an olefin selected from the group consisting of 1, 4-methylpentene, hexene, and octene;
   (ii) a copolymer of propylene and an olefin selected from the group consisting of $C_4$ to $C_{10}$ alpha-olefins; and,
   (iii) a copolymer of two different olefins selected from the group consisting of $C_4$ to $C_{10}$ alpha-olefins.

2. The chewing gum base of claim 1 which contains elastomer plasticizer, a softener, and a filler.

3. The chewing gum base of claim 1 which contains between 5 and 60 wt. % elastomer.

4. The chewing gum base of claim 1 which contains between 5 and 30 wt. % polyolefin thermoplastic elastomer.

5. The chewing gum base of claim 1 wherein the polyolefin thermoplastic elastomer is a copolymer of ethylene and an olefin selected from the group consisting of 1,4-methylpentene, hexene, and octene.

6. The chewing gum base of claim 1 wherein the polyolefin thermoplastic elastomer is a copolymer of propylene and an olefin selected from the group consisting of $C_4$ to $C_{10}$ alpha-olefins.

7. The chewing gum base of claim 1 wherein the polymeric polyolefin thermoplastic elastomer contains polymeric crystallinity.

8. The chewing gum base of claim 1 wherein the polymeric polyolefin thermoplastic elastomer is formed using a metallocene catalyst.

9. The chewing gum base of claim 1 wherein the gum base comprises a blend of polyolefin thermoplastic elastomer and at least one other elastomer.

10. The chewing gum base of claim 1 wherein the polyolefin thermoplastic elastomer is prepared from olefin monomers having a source other than petroleum.

11. A chewing gum comprising: a) a water-insoluble chewing gum base comprising a polyolefin thermoplastic elastomer, which is cud-forming and chewable at mouth temperature, wherein the polyolefin thermoplastic elastomer is selected from the group consisting of:
   (i) a copolymer of ethylene and an olefin selected from the group consisting of 1, 4-methylpentene, hexene, and octene;
   (ii) a copolymer of propylene and an olefin selected from the group consisting of $C_4$ to $C_{10}$ alpha-olefins; and,
   (iii) a copolymer of two different olefins selected from the group consisting of $C_4$ to $C_{10}$ alpha-olefins;
   b) a water soluble bulk portion; and
   c) a flavor.

12. The chewing gum of claim 11 wherein the polyolefin thermoplastic elastomer is a copolymer of ethylene and an olefin selected from the group consisting of 1,4-methylpentene, hexene, and octene.

13. The chewing gum of claim 11 wherein the polyolefin thermoplastic elastomer contains polymeric crystallinity.

14. The chewing gum of claim 11 wherein the polyolefin thermoplastic elastomer is a copolymer of propylene and an olefin selected from the group consisting of $C_4$ to $C_{10}$ alpha-olefins.

15. The chewing gum of claim 11 which contains 10 to 50 wt. % chewing gum base.

16. The chewing gum of claim 11 in which the chewing gum base contains 5 to 30 wt. % elastomer.

17. A method to produce a chewing gum, comprising mixing a water-insoluble chewing gum base, a water-soluble bulk portion, and a flavor, wherein the water-insoluble gum base comprises a polyolefin thermoplastic elastomer, which is cud-forming and chewable at mouth temperature, wherein the polyolefin thermoplastic elastomer is selected from the group consisting of:
   (i) a copolymer of ethylene and an olefin selected from the group consisting of 1, 4-methylpentene, hexene, and octene;
   (ii) a copolymer of propylene and an olefin selected from the group consisting of $C_4$ to $C_{10}$ alpha-olefins; and,
   (iii) a copolymer of two different olefins selected from the group consisting of $C_4$ to $C_{10}$ alpha-olefins.

18. The method of claim 17 wherein the polyolefin thermoplastic elastomer is not pre-ground before mixing.

19. The method of claim 17 wherein the polyolefin thermoplastic elastomer is a copolymer of ethylene and an olefin selected from the group consisting of 1,4-methylpentene, hexene, and octene.

20. The method of claim 17 wherein the polyolefin thermoplastic elastomer is a copolymer of propylene and an olefin selected from the group consisting of $C_4$ to $C_{10}$ alpha-olefins.

21. The method of claim 17 wherein the polyolefin thermoplastic elastomer is a copolymer of two different olefins selected from the group consisting of $C_4$ to $C_{10}$ alpha-olefins.

22. The chewing gum base of claim 1 wherein the polyolefin thermoplastic elastomer is a copolymer of two different olefins selected from the group consisting of $C_4$ to $C_{10}$ alpha-olefins.

23. The chewing gum of claim 11 wherein the polyolefin thermoplastic elastomer is a copolymer of two different olefins selected from the group consisting of $C_4$ to $C_{10}$ alpha-olefins.

* * * * *